(12) United States Patent
Rezayat (10) Patent No.: US 8,984,001 B2
(45) Date of Patent: Mar. 17, 2015

(54) SYSTEM AND METHOD FOR DIGITAL ASSISTANCE AGENTS IN PRODUCT LIFECYCLE MANAGEMENT

(75) Inventor: Mohsen Rezayat, Terrace Park, OH (US)

(73) Assignee: Siemens Product Lifecyle Management Software Inc., Plano, TX (US)

( * ) Notice: Subject to any disclaimer, the term of this patent is extended or adjusted under 35 U.S.C. 154(b) by 728 days.

(21) Appl. No.: 13/046,153

(22) Filed: Mar. 11, 2011

(65) Prior Publication Data

US 2011/0225183 A1    Sep. 15, 2011

Related U.S. Application Data

(60) Provisional application No. 61/339,988, filed on Mar. 11, 2010, provisional application No. 61/451,807, filed on Mar. 11, 2011.

(51) Int. Cl.
*G06F 17/30* (2006.01)
*G06Q 10/10* (2012.01)

(52) U.S. Cl.
CPC ...................................... *G06Q 10/10* (2013.01)
USPC ....................................................... 707/769

(58) Field of Classification Search
CPC ..... G06Q 10/10; G06Q 10/06; G06Q 10/087; G06Q 10/0875; G06Q 10/101; G06Q 10/063114; G06Q 10/103; G06F 17/2785; G06F 8/10
USPC ....................................................... 707/769
See application file for complete search history.

(56) References Cited

U.S. PATENT DOCUMENTS

| | | | |
|---|---|---|---|
| 6,922,684 B1* | 7/2005 | Aldridge et al. | 706/60 |
| 7,176,942 B2* | 2/2007 | Chartier et al. | 345/619 |
| 7,663,625 B2* | 2/2010 | Chartier et al. | 345/440 |
| 2002/0183878 A1* | 12/2002 | Chartier et al. | 700/98 |
| 2003/0158855 A1* | 8/2003 | Farnham et al. | 707/102 |
| 2007/0028175 A1* | 2/2007 | Moore et al. | 715/733 |
| 2007/0061154 A1* | 3/2007 | Markvoort et al. | 705/1 |

(Continued)

OTHER PUBLICATIONS

PCT International Search Report mailed Feb. 13, 2012 corresponding to PCT International Application No. PCT/IB2011/000533 filed Mar. 14, 2011 (13 pages).

(Continued)

*Primary Examiner* — Pierre Vital
*Assistant Examiner* — Evan Aspinwall (57) ABSTRACT

A method, data processing system, and machine-readable storage medium are provided for digital assistance agents in product lifecycle management. The method includes obtaining context information relating to a first user of a product lifecycle management (PLM) system from an interaction between the first user and a second user of the PLM system. The method also includes receiving input information from the first user and one or more other users of the PLM system. The method further includes receiving action information from or sending action information to the PLM system, where the action information is related to the input information and the context information. The method also includes sending output information to at least some of the first user and the one or more other users of the PLM system, where the output information relating to a result of receiving action information from or sending action information to the PLM system.

15 Claims, 4 Drawing Sheets

(56) References Cited

U.S. PATENT DOCUMENTS

| | | |
|---|---|---|
| 2008/0027769 A1* | 1/2008 | Eder ............................... 705/7 |
| 2008/0066149 A1* | 3/2008 | Lim ................................ 726/1 |
| 2008/0086683 A1* | 4/2008 | Rich et al. .................... 715/239 |
| 2008/0281835 A1* | 11/2008 | Hirsch et al. ................. 707/100 |
| 2010/0191579 A1* | 7/2010 | Sudarshan et al. ............. 705/10 |

OTHER PUBLICATIONS

Morad Mahdjoub, et al; A collaborative Design for Usability approach supported by Virtual Reality and a Multi-Agent System embedded in a PLM environment; GB; 2009; (12 pages).

Qi Hao, et al; Agent-based collaborative product design engineering: An industrial case study; 2005; Korea; (14 pages).

* cited by examiner

SYSTEM AND METHOD FOR DIGITAL ASSISTANCE AGENTS IN PRODUCT LIFECYCLE MANAGEMENT

CROSS-REFERENCE TO RELATED APPLICATIONS

The present application is related to, and claims priority to, U.S. Provisional Patent Application No. 61/339,988, filed Mar. 11, 2010, and to U.S. Provisional Patent Application No. 61/451,807, filed Mar. 11, 2011, both of which are hereby incorporated by reference into the present application as if fully set forth herein.

TECHNICAL FIELD

The present disclosure is directed, in general, to systems and methods for use in computer-aided design, manufacturing, engineering, modeling, and visualization (individually and collectively, "CAD" and "CAD systems") and in product lifecycle management ("PLM") and other systems.

BACKGROUND OF THE DISCLOSURE

Many manufactured products are first designed and modeled in CAD systems, and PLM systems are used by manufacturers, retailers, customers, and other users to manage the design, use, and disposal of various products. Improved systems are desirable.

SUMMARY OF THE DISCLOSURE

To provide digital assistance agents in product lifecycle management, disclosed embodiments include a method, data processing system, and machine-readable storage medium. The method includes obtaining context information relating to a first user of a product lifecycle management (PLM) system from an interaction between the first user and a second user of the PLM system. The method also includes receiving input information from the first user and one or more other users of the PLM system. The method further includes receiving action information from or sending action information to the PLM system, where the action information is related to the input information and the context information. The method also includes sending output information to at least some of the first user and the one or more other users of the PLM system, where the output information relating to a result of receiving action information from or sending action information to the PLM system.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Disclosed embodiments include a platform that renders the decision-making process more effective in today's increasingly complex production environments. Various disclosed systems and methods are referred to herein as the High-Definition Product Lifecycle Management (PLM) (HDPLM) system. Features of HDPLM, in various embodiments, include (i) placing users in the right context based on the user's role in a PLM process and history of interactions with the PLM process (which may be separately and jointly referred to as an "Active Workspace"); (ii) presenting information to the user from multiple sources in a PLM system, where the information is selected and arranged according to the user's current activities (which may be referred to as High-Definition Visualization); (iii) pro-actively assisting the user in accomplishment of tasks (which may be referred to as Digital Assistance); (iv) providing access to information on one or more of a plurality of wired and wireless devices (which may be referred to as Enterprise Mobility); and (v) verifying decision-making processes employed by the user or a group of users against one or more recorded decision-making rationales previously used or authorized (which may be referred to as Company Wisdom).

Broadly viewed, various disclosed embodiments of the HDPLM system address challenges in production environments by providing a collaborative and pro-active portal for all users, placing these users in the right context, empowering them to deal with complex problems and, at the same time, being sensitive to their individual needs. These users may be employees of an Original Equipment Manufacturer (OEM), suppliers and/or production partners of an OEM, and/or consumers of the OEM's products. Architecturally, the HDPLM system is composed of a collection of role-based portals that allow effective communication between OEMs, their partners and suppliers, and their consumers.

By being placed in the right context, having access to agents that are always evaluating new information against a rationale, and presented with an intuitive representation of all information on one of a plurality of wired and wireless devices, users may be empowered to make timely decisions that are recorded for future reference. This capability, in turn, may result in increasing a quality of user knowledge through verified best practices. Thus, an active workspace accompanied by high-def visualization, mobility, and digital assistance, may facilitate the decision-making process by users while, at the same time, enhancing company wisdom.

Figure 1:
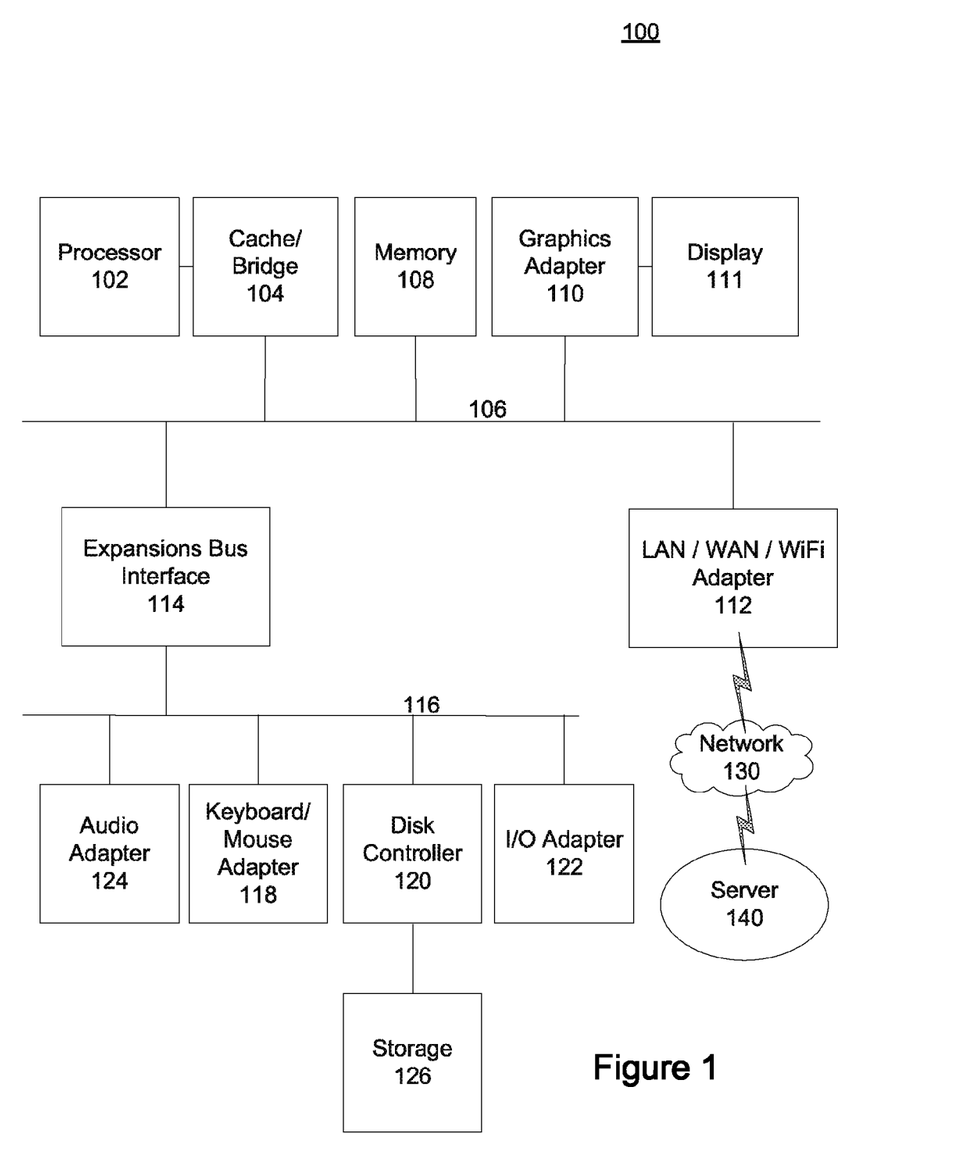
FIG. 1 depicts a data processing system in which an embodiment can be implemented.

FIG. 1 depicts a block diagram of a data processing system in which an embodiment can be implemented, as a client data processing system, a server data processing system, and a network system. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

Figure 3:
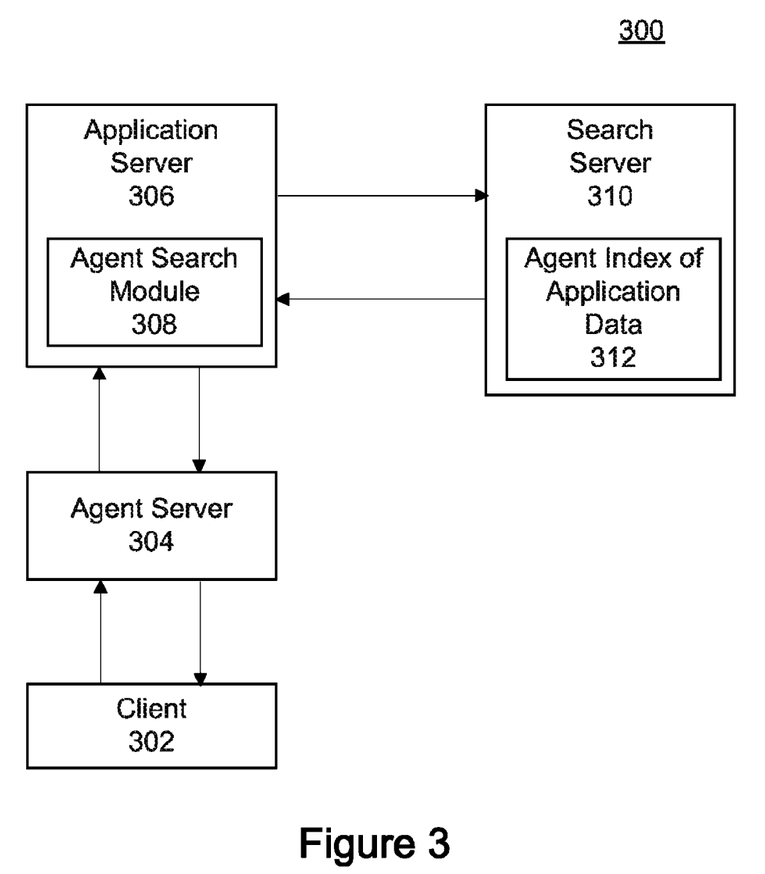
FIG. 3 depicts a system in accordance with disclosed embodiments.
Figure 4:
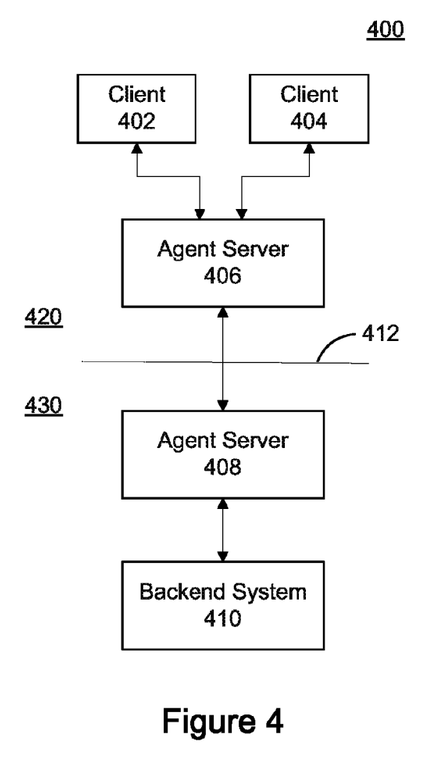
FIG. 4 depicts another system in accordance with disclosed embodiments.
Figure 5:
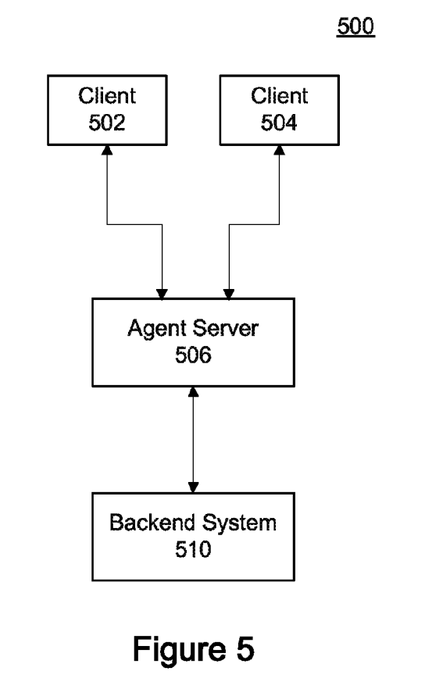
FIG. 5 depicts yet another system in accordance with disclosed embodiments.

The data processing system 100 may be modified to operate as part of system providing digital assistance agents in product lifecycle management and configured to perform processes as described herein. The data processing system 100 may provide all or a portion of an agent server or application server, as depicted in FIGS. 3-5. In providing such service, the data processing system 100 may operate in the role of one or more elements of the systems shown in FIGS. 3-5.

Digital Assistance according to the disclosure is provided by agents, which are pieces of software that run inside of HDPLM system components. Agents are adapted to interact with other HDPLM system components and/or one or more users, in order to help users perform tasks or to provide information to the user. Such information may be from a plurality of sources. Agents reduce or eliminate the need for a user to individually launch a plurality of applications, and may minimize situations in which the user must point and click on multiple elements of components user interfaces in order to accomplish a task.

Agents may be accessed by applications outside the HDPLM system. For example, an external collaboration tool may access agents while supporting collaboration sessions. Participants in such a session might use agents to help manage issues or find documents while collaborating with suppliers. While the agents may interact with applications outside the HDPLM system, the functionality of the agents remains within the HDPLM system, to ensure that the agents have access to necessary information.

An agent according to the disclosure is aware of a context in which it is operating. The context of an agent may be a collection of HDPLM system objects that should be considered when the agent is performing actions. For example, during design of a vehicle, in a collaborative meeting between designers and suppliers, the context might be all of the parts in the exhaust system of the vehicle. An Issue Management agent activated during such a meeting might use such a context to generate a list of issues relating only to parts in the exhaust system. Similarly a Requirements agent activated during such a meeting might use such a context to generate a list of requirements for only the parts in the exhaust system. A user may add additional information for the agent to use in its search, such as issues to do with vibration.

The agent may obtain context information from the collaboration system or the HDPLM system, such as information relating to an agenda for the collaborative meeting. In some embodiments, a user may provide additional context information via a user interface. For example, a set context button activated by the user may set an agent's context to currently visible parts. If the user has a model of a car loaded, but only wants the agent to find items related to the wheels, the user may turn off all of the parts except for the wheels, and then click the set context button. This sets the agent context to the visible parts—the wheels.

An agent according to the disclosure is adapted to use one or more of several categories of information in performing its functions. An agent is adapted to recognize a context in which it is operating. Context may include roles of collaboration participants, meeting agendas or topics, user inputs, and other information indicating a framework in which the agent is being utilized. An agent is adapted to obtain a history for its present context—that is, information about previous decisions, discussions, collaboration contacts, changes, updates, and other background information. An agent is adapted to get or put information to other HDPLM applications. An agent is adapted to provide notification to a user by signaling that the agent may have information relevant to a user or collaborative group, or by interjecting an offer of functionality or a result of an action into a collaboration session or other interaction of a user with the HDPLM system.

An agent is adapted to record decision-making and other processes performed by users and store records of such processes or validate such processes against previously stored information. An agent is adapted to compare a process that is currently or was recently performed by a user against stored "best practices" templates. Such best practices templates may be chosen by the agent based upon its awareness of the context of the user's process. Because it has access to all the best practices templates of the organization, the agent may recognize applicable templates that the user is not aware of or has forgotten. The agent is adapted to present to the user comparisons of the process to one or more such templates, enabling the user to verify or validate the process, or revise the process commensurate with the template(s).

A Collaboration agent may provide relevant, contextual information to users during a meeting. For example, the Collaboration agent might notice that the participants are talking about what material to use for a part, and bring up environmental information about the materials being discussed. Or, the Collaboration agent might realize that when talking about materials in the past, participants typically looked at a government list of banned materials, and automatically load that document in case it is needed.

When an HDPLM system user makes a decision, several issues (or options) are typically assessed and weighed for their advantages and disadvantages. The user is typically going through a rational process to sift through the options and arguments in favor of or against a particular action. An agent according to the disclosure may be adapted to notice one or more patterns in user behavior and context (such as noticing what kind of documents are looked at during collaboration sessions), record those patterns, and apply one or more patterns against future events to determine relevant information.

The validation aspect of agents captures this decision-making process and makes it available to users and organizations to validate their decisions. Agents are adapted to record a decision-making process rationale in the form of a mindmap template. Such templates are then re-used by agents at a later date to remind the user of past logic for the same or similar decisions. Such templates may also be elevated to "organizational best practices" for reuse by other users or integrated for automatic validation during the development process.

Two modes that agents according to the disclosure may use in interaction with users are "active" and "proactive." In active mode, an agent gathers information, but does not present the gathered information to the user unless asked. However, the agent in active mode does provide some notification to the user that the agent has information to present. For example, the active mode might be used by a CAD designer working on a part; as the design is created, the agent might gather information on the materials that could be used, relevant requirements, etc. In some embodiments, the icon for the agent changes color or flashes or otherwise indicates that the agent has information to present. However, the information is not presented until the user clicks on the icon and the agent displays the information to the user. Such a presentation may include input components (e.g., one or more buttons) for the user to indicate further action by the agent).

In proactive mode, an agent gathers information and provides it to the user as the information is found. Proactive mode might be used during a collaboration session, where the agent immediately offers to provide information that it has found that might be relevant to the discussion. In some embodiments, the agent may present its offered information in a chat transcript along with comments by human participants in a collaboration session. In other embodiments, the agent may present its information in an interaction window (or dialog box) to one or more participants in the collaboration session.

A user may switch the interaction mode of an agent. In the case of a meeting, the user who invited the agent to the meeting may modify that agent's mode. The agent performs the same work in each mode; the difference is how the agent interacts with users. In some circumstances, only one of active and proactive modes may be available. For example, for a single designer using an HDPLM system, an agent might be available exclusively in active mode, where the proactive mode doesn't make sense for that use case.

Figure 2:
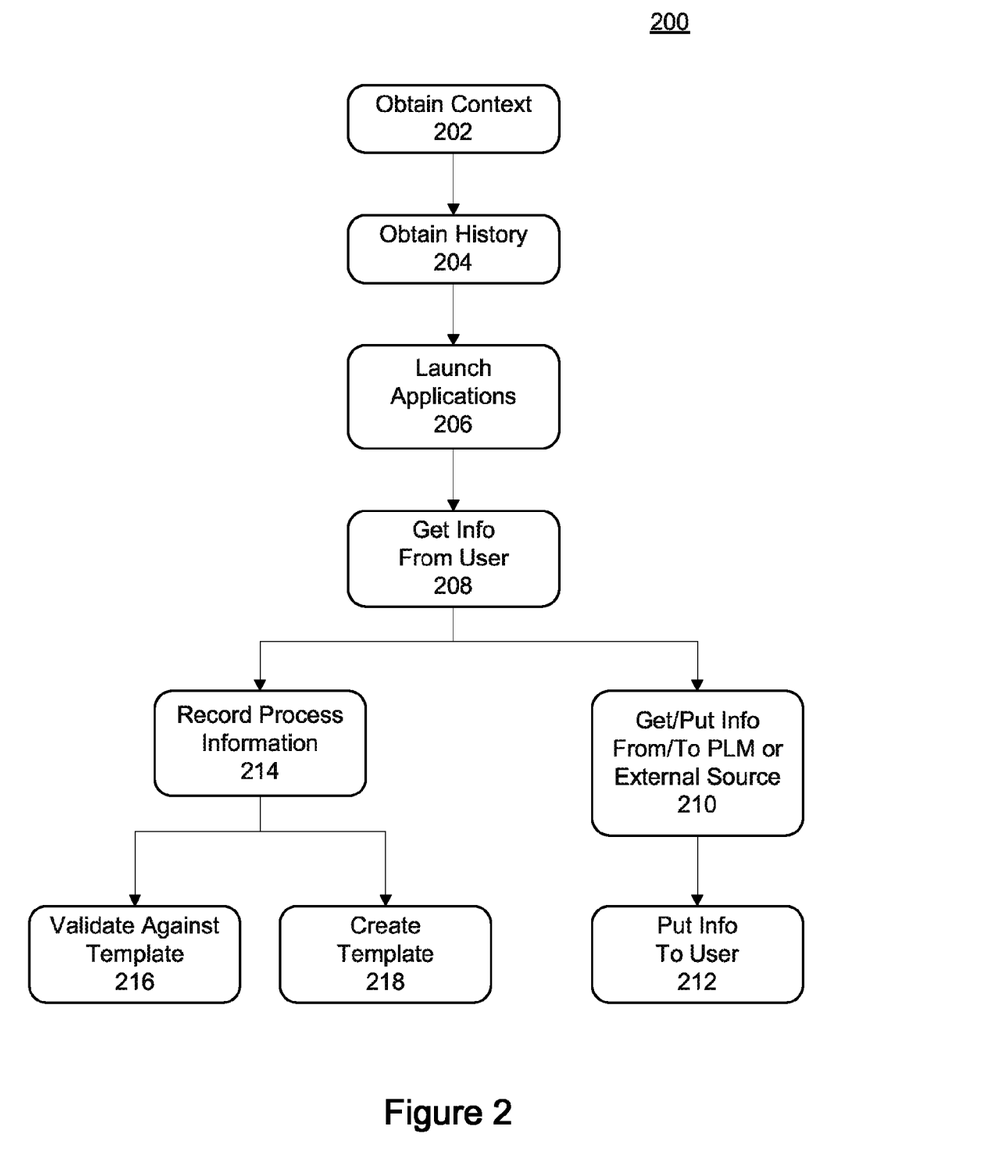
FIG. 2 depicts actions that may be performed by an agent in a process in accordance with disclosed embodiments.

FIG. 2 depicts actions that may be performed by an agent in a process 200 in accordance with disclosed embodiments. An agent may perform some or all of the actions in FIG. 2. The actions in FIG. 2 may be performed in the sequence shown or in other sequences, as instructed by a user or as appropriate in response to information obtained by the agent. An agent may be activated by a user in response to an indication of an activity to be performed or an issue to be resolved by the user. An agent may be activated to support a collaboration session between users of an HDPLM system.

In step 202, the agent obtains from the HDPLM system context information relating to a first user of an HDPLM system from an interaction of the first user with one or more other users of the HDPLM system. The context information may be obtained from or relate to the identities of one or more users who are interacting with the agent, for example, the users' roles in an organization, activity or collaboration session that the agent is supporting. The context information may be obtained from or relate to a subject matter, agenda, or displayed information of an application, activity or collaboration session that the agent is supporting. The context information may be obtained by direct or indirect input from a current user of the agent.

In step 204, the agent obtains from the HDPLM system history information relating to the context information. The history information may relate to previous decisions or discussions made in an activity supported by the agent. The history information may relate to previous uses by one or more current users, or users in similar roles, of the agent. The history information may relate to actions taken in previous collaboration sessions supported by the agent. The history information may relate to partial or complete decision-making processes engaged in by user(s) of the agent. The history information may relate to changes, updates, or other information that has occurred since a previous activation of the agent in one or more elements of the context information obtained in step 202.

In step 206, the agent may launch one or more HDPLM system processes or applications for users of the agent to employ in conducting an activity or collaboration session that the agent is supporting. The agent may select the applications based upon the context information obtained in step 202 or the history information obtained in step 204. The agent may provide context or history information to the applications in order to place the applications in a condition that the user expects or a condition in which the user left the application. As the agent performs actions to support the user, the agent may launch applications to support the agent in its performance of those actions.

In step 208, the agent receives (or "gets") input information from one or more of the users that the agent is supporting. The input information may be received by monitoring a collaboration session that the users are engaged in and detecting a topic or comment by a collaboration participant. The agent may show an interaction window (or dialog box) to request the input information from a user. A user may activate a dialog to push the input information to the agent.

In step 210, the agent may get or put action information from or to one or more files, databases, or applications of the HDPLM system, where the action information is based upon the input information received in step 208 and the context information received in step 202. The action information may further be based upon the history information obtained in step 204. The agent may get or put information from or to a data source external to the HDPLM system, such as a database, blog, or website maintained by a supplier, a customer, or a government entity. The agent may get or put a plurality of pieces of information in step 210, the actions of the agent determined in some cases by the input information received in step 208, and in other cases by information obtained during performance of step 210.

In step 212, the agent displays (or sends or "puts") output information back to one or more of the users. The output information may be a response to the input information received in step 208. The output information may be a request for further input information from the user, an offer to provide further information to the user, or an offer to perform further activities for the user.

In step 214, the agent records a decision-making or other process performed by user(s) in an activity or collaboration session. In step 216, the agent compares the recorded process to one or more templates of similar processes or processes of the same type in order to validate the recorded process. Such templates may be selected by the agent according to the context information obtained in step 202 and may represent organizational best practices that the user is encouraged or required to follow. The validation may compare the recorded process to best practices and provide feedback to the user(s) relating to a quality of the process or the decision made. The validation may compare the recorded process to one or more standards to certify that the process meets organizational or statutory requirements.

In step 218, the recorded process may be used to create a template for processes of the same type. Such a template may be stored for use in step 216 with subsequent recorded processes.

One or more agents in an HDPLM system may be provided by an agent server. Client platforms (e.g., JAVA® language, IPHONE® operating system, SHAREPOINT® platform, .NET connection software, etc.) that are to access agents are provided with an individualized client library to handle access to the server. The libraries hide the details of the server calls behind function calls. Inside the library, function calls may be converted to HTTP GET or POST requests (depending on the platform) to the server. On the server, an application programming interface routes the request to the appropriate agent. Agents may be implemented in the agent server as plug-ins. HDPLM system application objects may be converted to a standard format (such as XML) before being returned to a client.

FIG. 3 depicts a system 300 in accordance with disclosed embodiments. A user of a client 302 may be participating in a collaborative design session for a component, using a requirements agent that is running on an agent server 304. The client 302 sends a query to the requirements agent to find requirements relating to non-hazardous materials in the component.

To respond to the query, the requirements agent makes a call on an HDPLM system that is running on an application server 306. An agent search module 308 in the HDPLM system formats a full text search request, which includes query text ("non-hazardous materials"), a current user's group, and role information for the user of the client 302. The agent search module 308 sends the search request to a search server 310, which may access an index created for the agent of application data 312 in performing the search. The search server 310 returns search result information matching the search terms. The search result information may be formatted as an XML list of objects. The agent search module 308 may convert the search result information into an internal format used by the requirements application. For example, the agent search module 308 may parse the XML list of objects and build a list of objects in a proprietary agent format. The agent search module 308 returns the search result information to the client 302.

FIG. 4 depicts a system 400 in accordance with disclosed embodiments. Client 402 and client 404 are coupled to an agent server 406. The agent server 406 is coupled to an agent server 408, which is coupled to a backend system 410. A firewall 412 separates the system 400 into a public internet 420 and a corporate intranet 430. The clients 402 and 404 and the agent server 406 are outside the firewall 412, in the public internet 420. The agent server 408 and the backend system 410 are inside the firewall 412, in the corporate intranet 430.

The agent servers 406 and 408 may communicate with each other using plugins or other extension software. The agent server 408 may communicate with applications of the backend system 410 using plugins. The plugins used by the agent server 408 may be selected based upon a type of the backend system 410. The agent server 406, in the public internet, does not communicate directly with the backend system 410. The agent server 406 communicates with the backend system 410 through the agent server 408. The agent server 408 is adapted to provide full access to client applications that are in the corporate intranet, inside the firewall 412. However, the agent server 406 is adapted to expose only selected functions of the backend system 410 to clients 402 and 404 and other client applications outside the firewall 412, in the public internet 420.

Because the agent server 406 encapsulates all of the functionality of agents operating on the agent server 406, the clients 402 and 404 are only required to handle communication to and from the agent server 406, as well as the display of retrieved information. For example, a workflow agent running on the agent server 406 exposes a function to return a list of tasks assigned to a user. Where the client 402 is operating on an IPAD® mobile digital device and the client 404 is operating on a DROID® handheld device, Client libraries for IPAD mobile digital devices and DROID handheld devices are provided in the clients 402 and 404, respectively, and are adapted to retrieve the list of tasks from the workflow agent. Local platform functionality is then used in each of the clients 402 and 404 to display the list of tasks.

FIG. 5 depicts a system 500 in accordance with disclosed embodiments. A client 502 and a client 504 communicate with each other through an agent server 506. Because the agent server 506 encapsulates all of the functionality of the agents operating on the agent server 506, the clients 502 and 504 are only required to handle communication to and from the agent server 506, as well as the display of retrieved information.

Even where applications operating on the backend server 510 provide client side libraries that handle all of the communication with the applications, there may be individual client platforms that cannot use the libraries. For example, where the libraries are written in JAVA language, a client platform that does not support JAVA language, or a platform that does not support a full JAVA language environment, may not be able to use the application libraries. For such client platforms the agent server 506 is adapted to act as a middleman, using the application-supplied client side libraries to communicate with the application running on the backend server 510, and transforming the responses in to XML, which each of the clients 502 and 504 are adapted to handle. In a similar way, agent functionality may be entirely contained within the agent server 506, with the result that agent functionality can be supported on a single server environment, rather than on multiple server environments.

Issues Agent

An issues agent provides an example of an agent embodying elements of the disclosure. During a collaboration session between designers and suppliers, an issues agent obtains context information indicating that a context for the session is parts in an exhaust system of a car. The issues agent may use the context to generate a list of open issues relating to the parts of the exhaust system of the car. The issues agent monitors the collaboration session and actively searches for issues related to any part or assembly mentioned in the session. If issues or models are found, the issues agent interrupts the user and asks if the user wants to open the issues or models.

An underlying issues management (IM) process operates in an HDPLM system used for the collaboration session. When there is an issue with a part, the IM process is used to identify the problem, route problem descriptions and other data to the appropriate users, and provide a signoff history to prove that the process was followed. Such an IM process may use a plurality of HDPLM applications operating on one or more HDPLM platforms.

The issues agent is adapted to operate as an intermediary between a user and the IM process. In the absence of the issues agent, the user must perform the steps required to create and manage an IM process instance, which typically requires training. The issues agent is adapted to support user actions by mapping the user actions to IM process steps and base functionality. The issues agent is also adapted to manage data associated with an IM process item, making it easy for the user to search for an IM item, and view and create data necessary to manage the IM item.

Table 1 presents an example of user actions performed during a life cycle of an issue. Two users are represented, an Issue Manager and a CAD developer. Each user performs a plurality of actions during the life cycle of the issue.

TABLE 1

| Step | Role | Action |
|---|---|---|
| 1 | Issue Manager | Create an Item to hold the IM data. |
| 2 | Issue Manager | Submit the IM Item to the IM workflow. |
| 3 | Issue Manager | Send the structure to the Lifecycle Viewer. |
| 4 | Issue Manager | Generate markup on the structure, and save as a snapshot. Relate the snapshot to the latest revision of the IM Item. |
| 5 | Issue Manager | Signoff the task in the workflow. |
| 6 | CAD Developer | Review the task assignment. |
| 7 | CAD Developer | Review the attached snapshots in Lifecycle Viewer. |
| 8 | CAD Developer | Fix the issue. |
| 9 | CAD Developer | Generate markup on the structure, and save as a new snapshot. Relate the snapshot to the latest revision of the IM Item. |
| 10 | CAD Developer | Signoff the task in the workflow. |
| 11 | Issue Manager | Review the task assignment. |
| 12 | Issue Manager | Review the attached before and after snapshots in Lifecycle Viewer. |
| 13 | Issue Manager | If the change is satisfactory, signoff the task to complete the workflow. |
| 14 | Issue Manager | If the change is not satisfactory, revise the IM Item, and reject the task, looping back to step 6. |

The IM process generates part items and date and CAD items and data. These are the structure or parts that display the issue and are typically created before the IM process begins. The IM process also generates one or more snapshots, which are visualizations of the part structure and may include markup information.

One or more HDPLM applications operating on one or more HDPLM platforms provide the following base functionality that are used in the performance of the IM process:
1. Visualize the part structure and mark it up;
2. Generate a static snapshot of the part structure, along with any mark up, and store it as an item;
3. Create an IM item;
4. Relate snapshots to that item;
5. Submit the item to a workflow;
6. Sign off, and review of, workflow tasks, optionally providing a comment;
7. Send parts to a CAD program to be fixed;
8. Load one or more snapshots in one session for comparison; and
9. Revise the IM item.

Table 2 presents user actions supported by the issues agent, as well as the IM process steps and base functionality used by the issues agent to support the user actions:

TABLE 2

| User Action | IM Process Steps | Base Functionality |
|---|---|---|
| Create a new issue. | 1, 2 | 3, 5 |
| Markup a visualization and attach it to the issue. | 3, 4, 9 | 1, 2, 4, |
| Notification of assigned tasks. | 6, 11 | |
| Fix the issue. | 8 | 7 |
| See the current state of an issue. | 7, 12 | 8 |
| Approve/reject changes. | 5, 10, 13, 14 | 6, 9 |

Thus, the issues agent obtains content information regarding the collaboration session (parts in an exhaust system of a car) from a title of the session, a role of the session organizer as lead designer for the exhaust system, or from a discussion among session participants of the exhaust system parts. The issues agent accesses an IM process to obtain history information relating to existing issue items. The issues agent gets information from the session participants by monitoring comments and questions in the session or by being directly accessed by a session participant.

During the collaboration session, a problem may be discussed and the participants ask the issues agent to determine whether an issue (e.g., an IM item) exists relating to the problem. The issues agent searches the IM process to find such issues and, if any issues are found, puts any issues found to the participants in the session. If it is determined that an IM item does not exist, a participant may use the issues agent to create an IM item relating to the problem. The participants in the session may then have the issues agent utilize the IM process to generate a visualization of one or more parts relating to the issue. As the participants discuss the problem, one or more participants may add markup comments to the part structure. When the discussion of the issue is completed, a participant may use the issues agent to initiate IM process steps to assign tasks to resolve the issue.

While the collaboration session is in progress, or after it is completed, the issues agent compares the process followed in the session and any issue resolution steps performed after the session to one or more stored templates. The templates are selected by the issues agent based upon the information about the context of the issue that was obtained from the collaboration session. The templates may represent best practices of the users' organization. Conformation of the users' process to the templates may be required by the organization and, if the process fails validation against one or more of the templates, the issues agent may notify one or more of the users to reconvene the collaboration session or may identify for the user steps required to bring the process into compliance with the template(s).

Requirements Agent

A requirements agent provides another example of an agent embodying elements of the disclosure. During a collaboration session between designers and suppliers, a requirements agent obtains context information indicating that a context for the session is parts in an exhaust system of a car. The requirements agent is adapted to use the context and processes and applications of the HDPLM system to find requirements related to the context. The requirements agent is also adapted to assist session participants to view, verify and modify such requirements. The requirements agent is adapted to associate such requirements with parts in the exhaust system and link the requirements to their source and rationale. That is, the requirements agent is adapted to enable users to create, find, and view requirements, as well as find and view relationships between requirements and other items (e.g., parts) and the sources of those requirements, by utilizing HDPLM processes and applications that provide such functionality.

There are many sources for requirements. Formal requirements may be entered by HDPLM users. Customers may provide suggestions that are treated as informal requirements through TWITTER® messaging service TWEET® messages, emails, blog entries, web sites, and other communications via the Internet. It would be difficult for an HDPLM system user to keep track of all such different types of media, so the requirements agent to monitor, and suggest requirements to a human user.

When an HDPLM system user finds a source that should be followed for potential requirements, the user gives the type and location of the source to the requirements agent. The requirements agent is adapted to check the source at regular intervals—or to receive notifications when the source is updated. If an update seems like it may be a useful requirement, the requirements agent is adapted to notify a user. The user can then make a determination as to whether the potential requirement is valid or not. If the user determines that the source update should become a requirement, the agent is adapted to utilize HDPLM processes and applications to create the requirement and source objects, and relate them together.

In one example, a manufacturer has a blog where it posts updates to acceptable materials. An HDPLM system user adds the uniform resource locator (URL) of the blog to the requirements agent's list of sources to monitor. When the manufacturer posts a new blog entry, the requirements agent notices the update and, if the update seems like a potential requirement, the requirements agent notifies an HDPLM system user. The user may instruct the requirements agent to create a new requirement within the HDPLM system or to modify an existing requirement. In another example, another manufacturer may have a TWITTER account where its marketing group posts informal look and feel requirements. An HDPLM system user may add the TWITTER account to the requirements agent's list of sources to monitor. When the manufacturer sends a TWEET message that includes a new look and feel requirement, the requirements agent notices the update and, if the tweet seems like it could be a requirement for an HDPLM design, the requirements agent notifies an HDPLM system user.

Thus, in support of a collaboration session, the requirements agent is adapted to find requirements related to context information obtained regarding an HDPLM system user's current work or collaboration session. The requirements agent is also adapted to assist users in creating, finding, and viewing requirements. In an ongoing process, which may be separate from collaboration sessions, the requirements agent is adapted to monitor external sources for possible new requirements or changes to existing requirements. The requirements agent is adapted to consolidate calls to one or more HDPLM system processes or applications to facilitate user performance of actions related to user roles or activities.

According to various embodiments, one or more of the processes or steps described in relation to the figures described above may be performed alternately, concurrently, repeatedly, or in a different order, unless otherwise specifically described or claimed. "Receiving," as used herein, can include loading from storage, receiving from another data processing system such as over a network, receiving via an interaction with a user, a combination of these, or otherwise, as recognized by those of skill in the art.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of a instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method for use in a data processing system, the method comprising:
    obtaining in the data processing system context information relating to a first user of a product lifecycle management (PLM) system from an interaction between the first user and a second user of the PLM system;
    receiving in the data processing system input information from the first user and one or more other users of the PLM system;
    determining, by a processor of the data processing system, a context in which the data processing system is operating based on the context information;
    determining, by the processor, one or more patterns in user behavior and context to determine relevant information to be applied to future events;
    performing one of:
        receiving action information from and sending action information to the PLM system, the action information related to the input information and the context information, and
        sending from the data processing system output information to at least some of the first user and the one or more other users of the PLM system, the output information relating to the determined relevant information and a result of the one of receiving action information from and sending action information to the PLM system, wherein the output information is sent to the at least some of the first user and the one or more other users based on whether the PLM system is in an active mode or is in a proactive mode;
    recording in the data processing system a process performed by at least some of the first user and the one or more other users of the PLM system;
    comparing in the data processing system the recorded process to a template stored in the data processing system, the template created from a previous process performed by one or more users of the PLM system, the template automatically chosen based at least in part on the determined context; and
    presenting results of the comparison of the process to the template to at least some of the first user and the one or more other users.

2. The method of claim 1, further comprising launching an application in the PLM system, where the application is selected based upon the context information.

3. The method of claim 1, further comprising obtaining in the data processing system history information relating to the context information, wherein the action information is further related to the history information.

4. The method of claim 3, further comprising launching an application in the PLM system, where the application is selected based upon the history information.

5. The method of claim 1, wherein the recorded process has a type, the method further comprising selecting the stored information based on the type of the recorded process.

6. A data processing system comprising:
    a processor; and
    accessible memory,
    wherein the data processing system is particularly configured to:
    obtain context information relating to a first user of a product lifecycle management (PLM) system from an interaction between the first user and a second user of the PLM system;
    receive input information from the first user and one or more other users of the PLM system;
    determine one or more patterns in user behavior and context to determine relevant information to be applied to future events;
    perform one of:
        receive action information from and send action information to the PLM system, the action information related to the input information and the context information, and
        send output information to at least some of the first user and the one or more other users of the PLM system, the output information relating to the determined relevant information and a result of the one of receiving action information from and sending action information to the PLM system, wherein the output information is sent to the at least some of the first user and the one or more other users based on whether the PLM system is in an active mode or is in a proactive mode;
    record a process performed by at least some of the first user and the one or more other users of the PLM system;
    compare the recorded process to a stored template, the template created from a previous process performed by one or more users of the PLM system, the template automatically chosen based at least in part on a determined context in which the data processing system is operating; and present results of the comparison of the process to the template to at least some of the first user and the one or more other users of the PLM system.

7. The data processing system of claim 6, wherein the data processing system is further configured to launch an application in the PLM system, where the application is selected based upon the context information.

8. The data processing system of claim 6, wherein the data processing system is further configured to obtain history information relating to the context information, wherein the action information is further related to the history information.

9. The data processing system of claim 8, wherein the data processing system is further configured to launch an application in the PLM system, where the application is selected based upon the history information.

10. The data processing system of claim 6, wherein the recorded process has a type and the data processing system is further configured to select the stored information based on the type of the recorded process.

11. A non-transitory machine-readable storage medium encoded with computer-executable instructions that, when executed, cause a data processing system to perform the steps of:
obtaining context information relating to a first user of a product lifecycle management (PLM) system from an interaction between the first user and a second user of the PLM system;
receiving input information from the first user and one or more other users of the PLM system;
determining one or more patterns in user behavior and context to determine relevant information to be applied to future events;
performing one of:
receiving action information from and sending action information to the PLM system, the action information related to the input information and the context information, and
sending output information to at least some of the first user and the one or more other users of the PLM system, the output information relating to the determined relevant information and a result of the one of receiving action information from and sending action information to the PLM system, wherein the output information is sent to the at least some of the first user and the one or more other users based on whether the PLM system is in an active mode or is in a proactive mode;
recording a process performed by at least some of the first user and the one or more other users of the PLM system;
comparing the recorded process to a stored template, the template created from a previous process performed by one or more users of the PLM system, the template automatically chosen based at least in part on a determined context in which the data processing system is operating; and
presenting results of the comparison of the process to the template to at least some of the first user and the one or more other users of the PLM system.

12. The non-transitory machine-readable storage medium of claim 11, further encoded with computer-executable instructions that, when executed, cause a data processing system to perform the step of:
launching an application in the PLM system, where the application is selected based upon the context information.

13. The non-transitory machine-readable storage medium of claim 11, further encoded with computer-executable instructions that, when executed, cause a data processing system to perform the step of:
obtaining history information relating to the context information, wherein the action information is further related to the history information.

14. The non-transitory machine-readable storage medium of claim 13, further encoded with computer-executable instructions that, when executed, cause a data processing system to perform the step of:
launching an application in the PLM system, where the application is selected based upon the history information.

15. The non-transitory machine-readable storage medium of claim 11, wherein the recorded process has a type, the computer-readable storage medium further encoded with computer-executable instructions that, when executed, cause a data processing system to perform the step of:
selecting the stored information based on the type of the recorded process.

* * * * *